(12) United States Patent
Hervieux et al.

(10) Patent No.: US 12,253,174 B2
(45) Date of Patent: Mar. 18, 2025

(54) ABRADABLE SEAL

(71) Applicant: Goodrich Actuation Systems SAS, Buc (FR)

(72) Inventors: Arnauld Hervieux, Versailles (FR); Bastien Le Riguer, Morainvilliers (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 370 days.

(21) Appl. No.: 17/940,370

(22) Filed: Sep. 8, 2022

(65) Prior Publication Data
US 2023/0003303 A1    Jan. 5, 2023

Related U.S. Application Data

(62) Division of application No. 16/690,184, filed on Nov. 21, 2019, now abandoned, which is a division of
(Continued)

(30) Foreign Application Priority Data

May 22, 2015   (EP) ..................... 15305772

(51) Int. Cl.
*G01M 3/28*     (2006.01)
*F15B 15/14*    (2006.01)
(Continued)

(52) U.S. Cl.
CPC ....... *F16J 15/3496* (2013.01); *F15B 15/1452* (2013.01); *F16J 15/3296* (2013.01);
(Continued)

(58) Field of Classification Search
CPC .... F16J 15/3496; F16J 15/3296; F16J 15/445; F15B 15/1452; F15B 19/005; G01M 3/2869
See application file for complete search history.

(56) References Cited

U.S. PATENT DOCUMENTS 3,727,923 A    4/1973  McEwen
4,392,656 A    7/1983  Tirole et al.
(Continued)

FOREIGN PATENT DOCUMENTS

DE    102011076847 A1    12/2012

OTHER PUBLICATIONS

European Search Report for Application No. 18212236.6, mailed Mar. 22, 2019, 7 pages.
(Continued)

*Primary Examiner* — Xin Y Zhong
(74) *Attorney, Agent, or Firm* — CANTOR COLBURN LLP

(57) ABSTRACT

An abradable seal includes an outer ring arrangement and an energiser for urging said outer ring arrangement against an opposing surface, wherein an outermost surface of said outer ring arrangement defines a sealing surface of said abradable seal; wherein said outer ring arrangement is configured such that after a first period of operation said sealing surface suddenly transitions from having a relatively large surface area to having a relatively small surface area, so as to cause a sudden increase in internal leakage across the seal at said transition.

20 Claims, 4 Drawing Sheets

Related U.S. Application Data application No. 15/159,108, filed on May 19, 2016, now Pat. No. 10,520,095.

(51) Int. Cl.
  *F16J 15/3296* (2016.01)
  *F16J 15/34* (2006.01)
  *F16J 15/44* (2006.01)
  *F15B 19/00* (2006.01)

(52) U.S. Cl.
  CPC ......... *F16J 15/445* (2013.01); *G01M 3/2869* (2013.01); *F15B 19/005* (2013.01)

(56) References Cited

U.S. PATENT DOCUMENTS

| | | |
|---|---|---|
| 4,900,039 A | 2/1990 | Klecker et al. |
| 5,107,970 A | 4/1992 | Driessen et al. |
| 5,246,235 A | 9/1993 | Heinzen |
| 6,235,370 B1 | 5/2001 | Merrill et al. |
| 6,726,211 B1 | 4/2004 | Kuroki et al. |
| 7,144,477 B2 | 12/2006 | Gleason, Jr. |
| 8,336,887 B2 * | 12/2012 | Petrak .................. F16J 15/3224 277/572 |
| 2003/0015840 A1 | 1/2003 | Davis |
| 2010/0284797 A1 | 11/2010 | Jarrabet et al. |
| 2011/0116920 A1 | 5/2011 | Strock et al. |
| 2012/0248708 A1 | 10/2012 | Pattinson et al. |
| 2015/0322808 A1 | 11/2015 | Wulf |
| 2016/0312891 A1 | 10/2016 | Kantola et al. |
| 2016/0341318 A1 | 11/2016 | Hervieux et al. |
| 2018/0238767 A1 * | 8/2018 | Maurischat ............. F16K 1/443 |
| 2020/0088301 A1 | 3/2020 | Hervieux et al. |

OTHER PUBLICATIONS

Extended European Search Report of the European Patent Office for International Application No. EP15305772, Nov. 19, 2015, 16 pages.

* cited by examiner

ABRADABLE SEAL

CROSS REFERENCE TO RELATED APPLICATIONS

The present application is a division of U.S. application Ser. No. 16/690,184 filed Nov. 21, 2019 which is a division of U.S. application Ser. No. 15/159,108 filed May 19, 2016, (U.S. Pat. No. 10,520,095, issued Dec. 31, 2019), which claims priority to European Patent Application No. 15305772.4 filed May 22, 2015, the entire contents of each which is incorporated herein by reference.

TECHNICAL FIELD

The present disclosure relates generally to an abradable seal.

BACKGROUND

Abradable seals are used in a number of applications to provide a sealing function between two moving parts. For example, a piston arrangement may include a piston that is movable within a cylinder. The piston will function to separate two chambers, wherein the volume of each chamber varies depending on the position of the piston. Typically the piston and cylinder are metallic and a seal must be provided between these two components to prevent their contact whilst sealing the chambers, so as to prevent substantial amounts of fluid transferring from one chamber to the other.

It is desired to provide an improved abradable seal that is able to provide an improved indication regarding its failure.

SUMMARY

The present disclosure relates to an abradable seal comprising an outer ring arrangement and an energiser for urging the outer ring arrangement against an opposing surface, wherein an outermost surface of the outer ring arrangement defines a sealing surface of the abradable seal; wherein the outer ring arrangement is configured such that after a first period of operation the sealing surface suddenly transitions from having a relatively large surface area to having a relatively small surface area, so as to cause a sudden increase in internal leakage across the seal at the transition.

A sudden transition provides a measured, controlled or predetermined and sudden increase in internal leakage during operation of the seal, namely at the transition between normal and abnormal operation. This can be used to indicate or record the moment at which the seal requires replacing.

The wording "suddenly transitions" is used to indicate that the sealing surface does not transition due to, for example, a tapered outer ring. Whilst such an arrangement might transition from a relatively large surface area to a relatively small surface area, it would not do so suddenly, which is the aim of the broadest aspects of the present disclosure. A sudden transition happens due to a substantially instantaneous decrease in the surface area of the sealing surface.

The outer ring arrangement may comprise an abradable outer ring and an inner ring. The inner ring may also be abradable. The inner ring may comprise voids or apertures in its outer circumferential surface, and the sealing surface may transition from having a relatively large surface area to having a relatively small surface area due to the outer ring abrading in use so as to expose the voids or apertures in the inner ring.

The voids or apertures may extend between axial ends of the inner ring. The outer ring may have a uniform axial cross-section or width throughout its circumference, such that the sealing surface of the outer ring may be continuous or unbroken along its circumference.

The inner ring may have a non-uniform axial cross-section throughout its circumference, for example due to the voids or apertures that may break the sealing surface at positions around its circumference.

The inner ring may have a uniform axial width throughout its circumference, and may have a non-uniform radial width (e.g. due to the voids or apertures).

The outer ring may comprise a base portion and may comprise two circumferentially continuous side portions extending radially inward from respective axial ends of the base portion. The inner ring may fit within the side portions of the outer ring, such that, optionally, once the base portion wears away in use, the side portions may remain to provide part of the sealing surface after the transition.

The base portion may act as the sealing surface during the first period of operation.

The sealing surface may have a substantially constant surface area prior to the transition. The sealing surface may have a substantially constant, albeit smaller surface area after the transition for a given period of time.

The first period of time may define a period of normal operation of the seal. The transition may define a point of failure of the seal, and/or a point at which the seal requires replacement.

The relatively small surface area may be at least 5%, 10%, 20%, 30%, 40%, 50%, 60%, 70%, 80% or 90% smaller than the relatively large surface area.

The outer ring arrangement may be configured such that the transition does not cause catastrophic failure or damage to the abradable seal. For example, the sealing surface after the transition may still provide a sealing function, but it may be diminished slightly due to the smaller sealing surface area. The outer ring arrangement may be configured to provide a sealing function after the transition.

In accordance with an aspect of the disclosure, there is provided a seal assembly comprising: a first component; a second component movable with respect to, and in sealing engagement with the first component; and an abradable seal as claimed in any preceding claim, wherein the abradable seal is located between the first component and the second component.

The first component may comprise a cylinder. The second component may comprise a piston movable within the cylinder.

The method may comprise: monitoring internal leakage across the abradable seal; and detecting a sudden increase in internal leakage due to the sealing surface transitioning from having a relatively large surface area to having a relatively small surface area.

BRIEF DESCRIPTION OF THE DRAWINGS

Various embodiments will now be described, by way of example only, and with reference to the accompanying drawings in which.

DETAILED DESCRIPTION

An abradable seal in accordance with the present disclosure will now be described with reference to FIG. 1.

Figure 1:
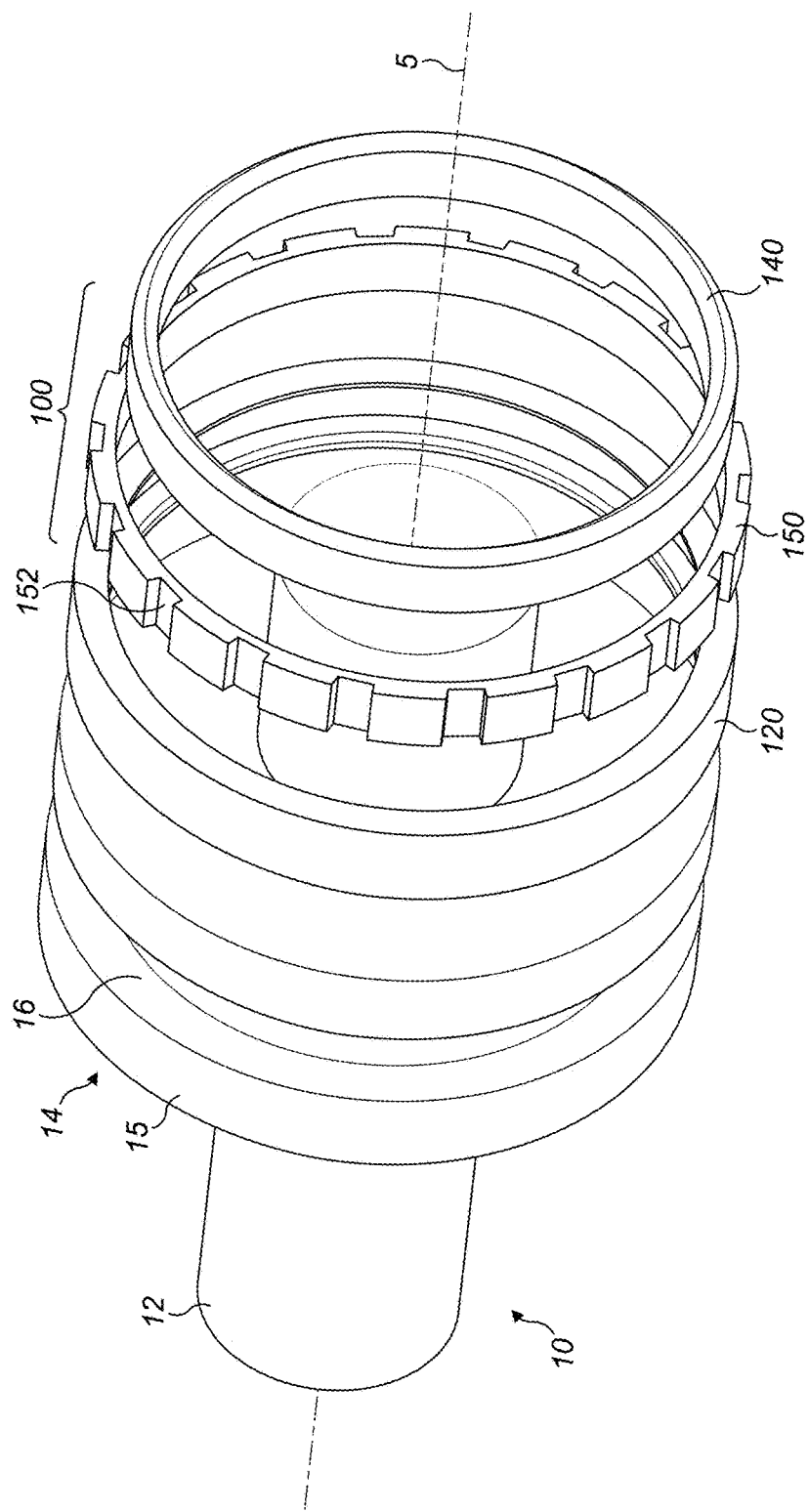
FIG. 1 shows an exploded, perspective view of an abradable seal.
Figure 3:
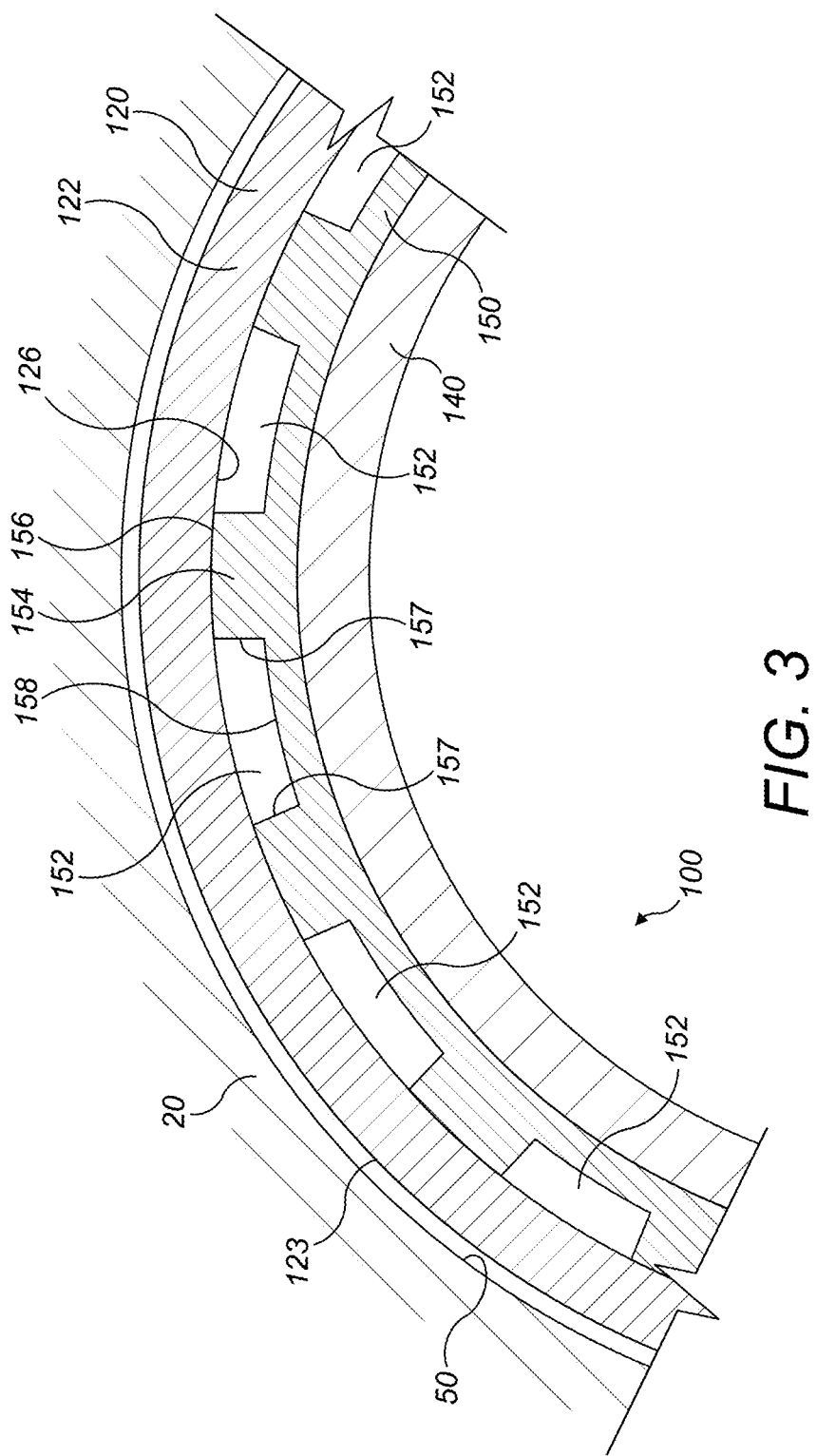
FIG. 3 shows a circumferential cross-section of the abradable seal of FIG. 1.

FIG. 1 shows a piston 10 that is arranged to move axially inside a cylinder 20 (shown in FIG. 3). The piston 10 comprises a shaft 12, wherein the longitudinal axis 5 of the shaft 12 forms the axis of movement of the piston 10. The piston 10 further comprises a flange 14 that extends radially from the shaft 12 to form a concentric disc extending towards the inner surface 50 of the cylinder 20 within which the piston 10 moves. The flange 14 comprises an outer peripheral surface 15 arranged to face the inner surface 50 of the cylinder and having a circumferential groove 16 therein.

An abradable seal 100 (or abradable seal assembly) is configured to sit within the groove 16 to provide a sealing function between the piston 10 and the inner surface 50 of the cylinder 20. It should be noted that FIG. 1 shows an exploded view such that the abradable seal 100 is not shown within the groove 16 so that its components can be clearly seen. The abradable seal 100 is known as a dynamic seal, in that it provides a sealing function between two or more parts that move relative to each other. In this case the parts comprise the piston 10 and the cylinder 20, wherein the piston 10 moves within the stationary cylinder 20. Thus, the inner surface 50 of the cylinder 20 can otherwise be referred to as the opposing surface 50 of the abradable seal 100.

It is envisaged that the abradable seal 100 could also be provided in a groove that is within the inner surface 50 of the cylinder 20, whilst having the same features as described herein in relation to the abradable seal 100 being within the flange 14 of the piston 10. In this case, the outer peripheral surface 15 of the flange may be flat (i.e. may comprise substantially no grooves) and could form the opposing surface 50 of the abradable seal 100. However, the piston 10 could only move a distance less than the axial length of the outer circumferential surface 15.

The abradable seal 100 comprises an abradable outer ring 120 that is arranged to contact the opposing surface 50 in use to form a seal between the piston 10 and the opposing surface 50. The outer ring 120 is designed to wear (or abrade) during use due to friction between the outer ring 120 and the opposing surface 50 caused by the piston 10 moving within the cylinder.

The abradable seal further comprises an energiser 140 for urging the abradable outer ring 120 away from the peripheral surface 15 of the flange 14 and against the opposing surface 50. The energiser 140 may be a compressible material, for example an elastomer. Alternatively, the energiser 140 may be a spring, for example a metallic coil or wave spring. The outer ring 120 may be compressed when the piston 10 is initially placed within the cylinder, and act to urge the outer ring 120 away from the peripheral surface 15 of the flange 14 once it is suitably placed.

Figure 2:
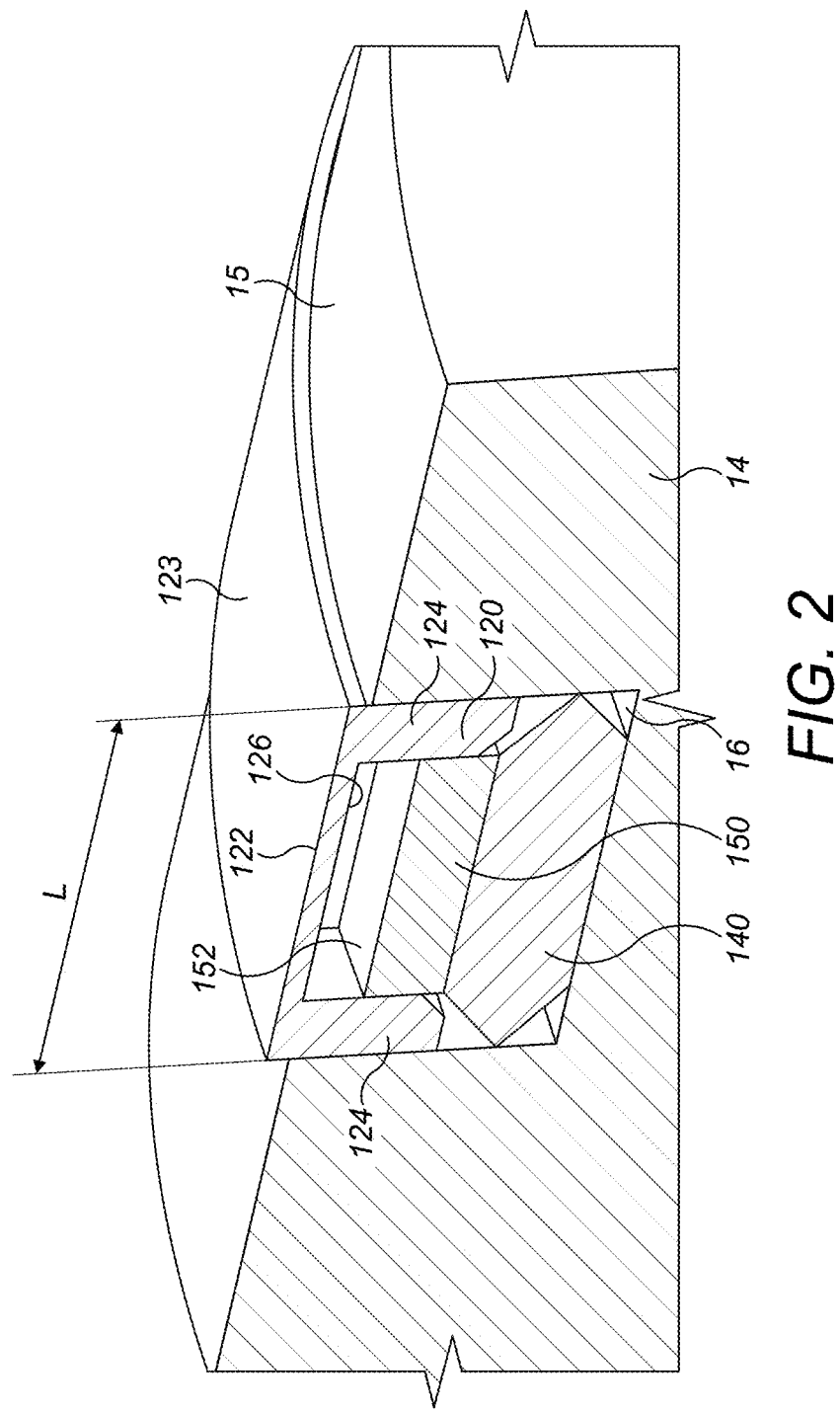
FIG. 2 shows an axial cross-section through the abradable seal of FIG. 3.

In accordance with the disclosure, the abradable seal 100 further comprises an ancillary ring 150 that is located radially inward from the outer ring 120, which is shown in more detail in FIG. 2.

FIG. 2 shows an axial cross-section of the flange 14 and the abradable seal 100, including the outer ring 120, energiser 140 and ancillary ring 150. The outer ring 120 comprises a base or outermost portion 122 extending axially to provide an initial or normal sealing surface 123, and two side portions 124 that extend radially inward from axial ends of the base portion 122. The base portion 122, and thus the sealing surface 123, have an axial length L. Thus, initially and during normal operation (defined below) the outer ring 120 has a U-shaped axial cross-section, which is uniform throughout its circumference. It will be appreciated that other shapes, for example an L-shaped axial cross-section are possible that will provide a similar uniform sealing surface throughout the outer circumference of the seal.

The ancillary ring 150 sits within the U-shape of the outer ring 120, and between the energiser 140 and the outer ring 120. The ancillary ring 150 comprises a number of apertures 152 in its outer circumference (see also FIG. 1), such that the ancillary ring 150 has a non-uniform axial cross-section throughout its circumference. In alternative arrangements the outer ring 120 and the ancillary ring 150 may be formed by the same component. The outer ring 120 and the ancillary ring 150 may be referred to as an outer ring arrangement.

FIG. 3 shows a circumferential cross-section of the abradable seal 100 through the circumferential groove 16, from which the apertures 152 in the ancillary ring 150 can be seen in more detail. In the illustrated embodiment, the apertures 152 are of uniform dimensions and are spaced apart at equal intervals in the outer circumference of the ancillary ring 150. A plurality of projections 154 are formed in the outer circumference of the ancillary ring 150 due to the apertures 152. Initially and during normal operation an outer surface 156 of the projections 154 contacts an inner circumferential surface 126 of the base portion 122 of the outer ring 120. The outer surface 156 is urged against the inner circumferential surface 126 by the energiser 140.

The apertures 152 comprise side walls 157 and a base surface 158 and may be formed by machining the outer circumference of the ancillary ring 150.

It can be seen that, in the illustrated embodiment of FIG. 2 and during normal operation, the apertures 152 of the ancillary ring 150 result in a plurality of chambers being formed that are enclosed by the base portion 123 and side portions 124 of the outer ring 120, as well as the side walls 157 and base surface 158 of the ancillary ring 150. Thus, each chamber represents a void in the outer ring arrangement, which in the illustrated embodiment comprises the outer ring 120 and the ancillary ring 150.

Initially and during normal operation, therefore, the abradable seal 100 will function by the energiser urging the outer ring 120 against the opposing surface 50, via the ancillary ring 150. The sealing surface 123 of the outer ring 120 is urged against the opposing surface 50 and provides a uniform circumferential sealing surface.

Normal operation as defined herein corresponds to the period of time in which the initial or normal sealing surface 123 and/or base portion 122 wears down but is not worn away. The initial or normal sealing surface area is the area of the sealing surface 123 during initial set up or normal operation respectively. Since no voids, apertures etc. are present in the initial or normal sealing surface area, this area is calculated as the axial length L of the sealing surface 123 multiplied by the initial or immediate circumference of the outer ring 120. During normal operation, therefore, the initial or normal sealing surface 123 has a constant or substantially constant surface area, known herein as a first, initial or normal sealing surface area.

In use, the normal sealing surface 123 will wear down due to friction between the sealing surface 123 and the opposing surface 50. As described above the surface area of the normal sealing surface 123 remains substantially constant whilst the base portion 122 exists during normal operation (i.e. is not worn away). That is, except for a minimal or negligible reduction in surface area due to the thickness of the seal wearing away (reducing the diameter of the seal and circumference), the first sealing surface area remains constant.

Figure 4:
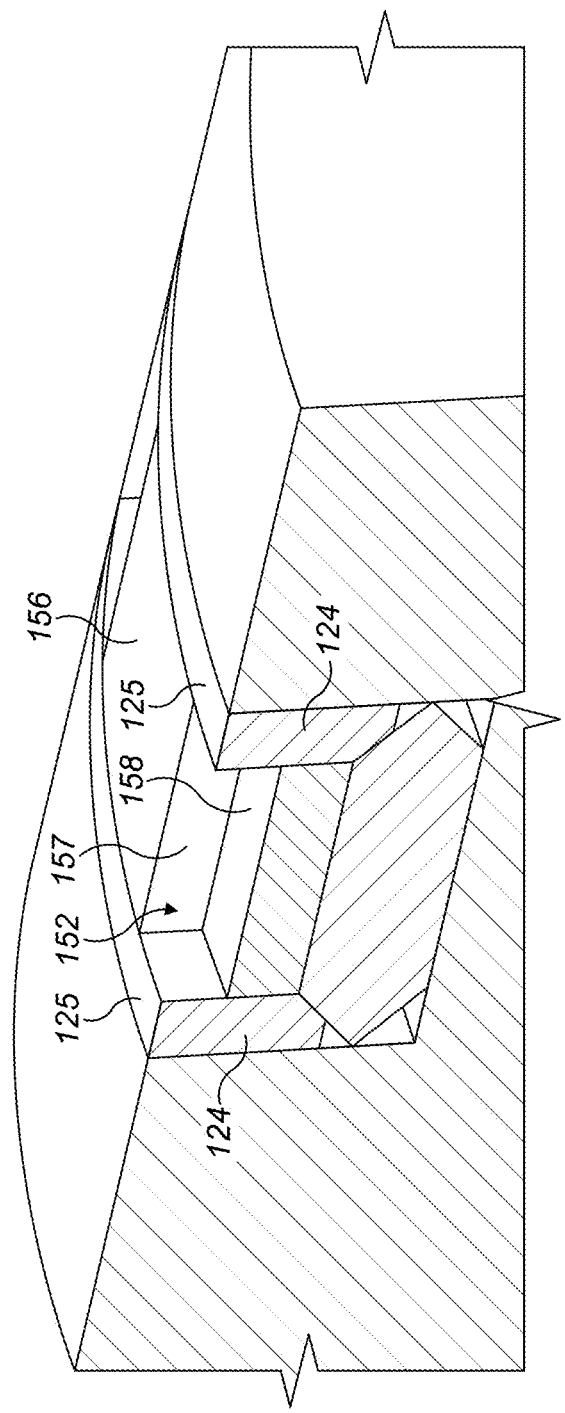
FIG. 4 shows an axial cross-section through the abradable seal of FIG. 1, once the seal has been worn in use.

FIG. 4 shows a transition point during operation of the piston 10, in which the base portion 122 and sealing surface 123 have just worn away. This exposes the chambers referred to above, by removing their outer surface, which was formed by the now-absent base portion 122.

Since the normal sealing surface 123 is no longer present, the abradable seal 100 is no longer in normal operation. Abnormal operation may be defined herein as any operation of the seal 100 other than normal operation, or may be defined as operation of the seal 100 once the normal sealing surface 123 is worn away.

In the illustrated case abnormal operation occurs once the normal sealing surface 123 wears away. At this point the sealing surface of the abradable seal 100 of FIG. 4 is formed by the upper surfaces 125 of the two remaining side portions 124 of the outer ring 120, as well as the outer surface 156 of the projections 154. The sealing surface in abnormal operation has a second sealing surface area that, due to the presence of apertures 152, is smaller than the first sealing surface area.

Referring back to FIG. 1, it will be appreciated that the piston 10 separates two chambers which are located either side of the flange 14, and the abradable seal 100 is configured to prevent fluid transfer between the chambers as the piston 10 moves back and forth along the longitudinal axis 5 of the shaft 12.

Typically, however, leakage exists between the two chambers and the amount of leakage is dependent in part on the surface area of the sealing surface. Leakage between chambers may be referred to as "internal leakage". Internal leakage and sealing surface area generally have a negative correlation with respect to each other.

The present disclosure provides a measured, controlled or predetermined and sudden increase in internal leakage during operation of the seal, namely at the transition between normal and abnormal operation. In the illustrated embodiment, this is achieved through a sudden reduction in the surface area of the abradable seal 100 at the transition between normal and abnormal operation. It should be noted that the outer ring arrangement still comprises a sealing surface or sealing surface area during abnormal operation, as described above. This means that, whilst the seal may not be fully operational, the transition between normal and abnormal operation does not cause catastrophic failure or damage to the seal.

In the illustrated embodiment, use of the apertures 152 in the ancillary ring 150 results in a sudden or immediate drop in sealing surface area, during or immediately after the transition from normal to abnormal operation. An operator could monitor or otherwise observe this drop in internal leakage at the transition from normal to abnormal operation, and immediately determine that the seal has failed.

As discussed, however, the outer ring arrangement still provides a sealing function during the transition from normal to abnormal operation, in that the side portions 124 and outer surface 156 of the outer ring arrangement provide a sealing surface. This allows the exact point at which the seal fails (or requires replacing) to be determined but without also causing damage to the seal 10, piston 10, cylinder 50 or other hydraulic parts associated with the seal 100.

The flow between the chambers during normal operation may be represented by the following equation:

$$Q_l = K(\text{oil}) \times \frac{j^3}{L} \times \Delta P \quad (1)$$

where $Q_l$ represents the internal leakage or flow between chambers of the piston, K represents the frictional coefficient of the oil, j represents the amount of radial movement of the seal, L is the axial length of the sealing surface (see L in FIG. 2) and $\Delta P$ is the pressure difference between the chambers. As is evident, the internal leakage has a negative correlation with the sealing surface area. This is represented by a length in equation (1) since the sealing surface in normal operation is uniform and continuous throughout its circumference.

Once the base portion 122 of the outer ring 120 is worn away, the internal leakage between the chambers suddenly increases, and the pressure difference suddenly decreases, due to the smaller surface area of the second sealing surface. The seal will still function, due to the remaining parts of the outer ring 120 (i.e. the side portions 124) and the ancillary ring 150. However, the flow between the chambers during abnormal operation may now be defined by the following relationship:

$$Q_{ab} \approx (1-\alpha)\frac{K(\text{oil})j^3}{L}\Delta P + \alpha\frac{K(\text{oil})j^3}{2L_B}\Delta P = \left[1 + \alpha\left(\frac{L}{2L_B} - 1\right)\right]Q_n \quad (2)$$

where $$\alpha = \frac{ne}{\pi D} \quad (3)$$

and where $Q_{ab}$ represents the flow between the chambers in abnormal operation, $Q_l$ represents the flow during normal operation (see (1)), K represents the frictional coefficient of the oil, j represents the amount of radial movement of the seal, $\Delta P$ is the pressure difference between the chambers, L is the axial length of the sealing surface (as in (1)), $L_B$ is the axial length of the ancillary ring 150, n is the number of apertures 152 and e is the circumferential length of the apertures 152.

Equations (1) and (2) show that there will be a clear difference in the measured flow or pressure between the chambers separated by the abradable seal 100.

An abradable seal 100 according to the above-described embodiment may be used in many applications. In particular, the above abradable seal 100 may be used in an aircraft hydraulic actuator. The piston 10 as described above may be used to actuate a specific aircraft component, for example a flap or rudder.

Whilst a flight control computer ("FCC") may monitor internal leakage or pressure, it is not possible in conventional aircraft actuators to detect failure of the seal, other than to operate the seal until catastrophic failure. This is clearly undesirable, and means that most seals have to be manually inspected and usually replaced before the end of their service life. Using an abradable seal 100 according to the present disclosure allows an operator to detect failure of the seal in, for example, a pre-flight check, by monitoring internal leakage or a pressure drop in the actuator using, for example, a flight control computer. This reduces the need for manual inspections and allows the seal to be used to the full extent of its service life.

Although the present disclosure has been described with reference to the embodiments described above, it will be understood by those skilled in the art that various changes in form and detail may be made.

For example, in its broadest aspects the abradable seal of the present disclosure may have uses in any application where it would be beneficial to detect certain points in the service life of the seal without having to manually inspect it. For example, a plurality of sudden reductions in the surface area of the sealing surface could be provided, corresponding to 50%, 20%, 10% etc. of the remaining service life of the seal. This is beneficial for certain seals which, for example, may be embedded in pumping equipment and could be very difficult to inspect.

The invention claimed is:

1. A method of monitoring a ring seal in an aircraft using a flight control computer, the ring seal being an abradable seal comprising an outer ring arrangement and an energiser for urging said outer ring arrangement against an opposing surface, wherein an outermost surface of said outer ring arrangement defines a sealing surface of said abradable seal, wherein said outer ring arrangement is configured such that after a first period of operation said outermost surface suddenly transitions from having a relatively large surface area to having a relatively small surface area, so as to cause a sudden increase in internal leakage across the seal at said transition,
wherein the method comprises using the flight control computer to:
monitor a pressure difference across said abradable seal; and
detect a sudden decrease in the pressure difference due to said sealing surface transitioning from having a relatively large surface area to having a relatively small surface area.

2. A method as claimed in claim 1, wherein said outer ring arrangement comprises an abradable outer ring and an inner ring comprising voids or apertures in an outer circumferential surface of the inner ring, wherein said transition occurs due to said outer ring abrading in use to expose said voids or apertures in said inner ring.

3. A method as claimed in claim 2, wherein said voids or apertures extend between axial ends of said inner ring.

4. A method as claimed in claim 2, wherein said outer ring has a uniform axial cross-section or width throughout a circumference of the outer ring.

5. A method as claimed in claim 2, wherein said inner ring has a non-uniform axial cross-section throughout a circumference of the inner ring.

6. A method as claimed in claim 2, wherein said inner ring has a uniform axial width throughout a circumference of the inner ring.

7. A method as claimed in claim 2, wherein said outer ring comprises a base portion and two circumferentially continuous side portions extending radially inward from respective axial ends of said base portion.

8. A method as claimed in claim 7, wherein said base portion acts as said sealing surface during said first period of operation.

9. A method as claimed in claim 7, wherein said inner ring fits within said side portions of said outer ring, such that once said base portion wears away in use, said side portions remain to provide part of said sealing surface after said transition.

10. A method as claimed in claim 1, wherein said sealing surface has a substantially constant surface area prior to said transition.

11. A method as claimed in claim 1, wherein said first period of time defines a period of normal operation of said seal, and/or said transition defines a point of failure of said seal, or a point at which said seal requires replacement.

12. A method as claimed in claim 1, wherein said relatively small surface area is at least 10%, 20% or 50% smaller than said relatively large surface area.

13. A method as claimed in claim 1, wherein said outer ring arrangement is configured such that said transition does not cause catastrophic failure or damage to said abradable seal.

14. A method as claimed in claim 1, wherein said outer ring arrangement is configured to provide a sealing function after said transition.

15. A method as claimed in claim 1, wherein the sealing surface is defined as an outer, circumferentially extending surface of the outer ring arrangement that is urged in an outer radial direction against the opposing surface so as to constantly contact it and gradually wear away in use.

16. A method as claimed in claim 1, wherein said sealing surface of the outer ring arrangement wears away in a radial direction from a first sealing surface having a relatively large surface area to a second sealing surface radially inward of the first sealing surface and having a relatively small surface area, wherein after the first period of operation the sealing surface suddenly transitions from the first sealing surface to the second sealing surface, and wherein said outer ring arrangement comprises an abradable outer ring comprising the first sealing surface and an inner ring comprising the second sealing surface.

17. A method of monitoring a seal of a seal assembly, the seal assembly comprising:
a first component;
a second component movable with respect to, and in sealing engagement with said first component; and
an abradable ring seal comprising an outer ring arrangement and an energiser for urging said outer ring arrangement against an opposing surface, wherein an outermost surface of said outer ring arrangement defines a sealing surface of said abradable ring seal, wherein said outer ring arrangement is configured such that after a first period of operation said outermost surface suddenly transitions from having a relatively large surface area to having a relatively small surface area, so as to cause a sudden increase in internal leakage across the abradable ring seal at said transition,
wherein the method comprises:
monitor a pressure difference across said abradable ring seal; and
detect a sudden decrease in the pressure difference due to said sealing surface transitioning from having a relatively large surface area to having a relatively small surface area.

18. A method as claimed in claim 17, wherein the sealing surface is defined as an outer, circumferentially extending surface of the outer ring arrangement that is urged in a radial direction against the opposing surface so as to constantly contact it and gradually wear away in use.

19. A method as claimed in claim 17, wherein said sealing surface of the outer ring arrangement wears away in a radial direction from a first sealing surface having a relatively large surface area to a second sealing surface radially inward of the first sealing surface and having a relatively small surface area, wherein after the first period of operation the sealing surface suddenly transitions from the first sealing surface to the second sealing surface, and wherein said outer ring arrangement comprises an abradable outer ring comprising the first sealing surface and an inner ring comprising the second sealing surface.

20. A method of monitoring a ring seal, the ring seal being an abradable seal comprising:
- an outer ring arrangement, wherein said outer ring arrangement defines a first sealing surface and a second sealing surface of said abradable seal, the second sealing surface having a second surface area that is at least 5% smaller than a first surface area of the first sealing surface, wherein said outer ring arrangement is configured such that after a first period of operation an outermost surface of the outer ring arrangement suddenly transitions from the first sealing surface to the second sealing surface, so as to cause a sudden increase in internal leakage across the seal at said transition; and
- an energiser for urging said outer ring arrangement against an opposing surface;

wherein the method comprises:
- monitor a pressure difference across said abradable seal; and
- detect a sudden decrease in the pressure difference due to said outermost surface transitioning from having the first surface area to having the second surface area.

* * * * *